United States Patent [19]

French et al.

[11] 4,315,630
[45] Feb. 16, 1982

[54] SEALING RING FOR SPIGOT AND SOCKET PIPE JOINT

[75] Inventors: David W. French, Littleton; Robert W. Heisler, Littleton; Antonio Maldarella, Jr., Jefferson County; Gilbert W. Vanhoy, Denver, all of Colo.

[73] Assignee: Johns-Manville Corporation, Denver, Colo.

[21] Appl. No.: 154,668

[22] Filed: May 30, 1980

[51] Int. Cl.³ .............................................. F16J 15/32
[52] U.S. Cl. ................................ 277/207 A; 285/110; 285/231; 285/345; 285/379; 277/15.2; 277/166
[58] Field of Search ............... 285/110, 230, 231, 345, 285/379; 277/207 A, 207 R, 166, 152, 153

[56] References Cited

U.S. PATENT DOCUMENTS

| 2,330,104 | 9/1943 | Antonelli | 277/153 |
| 3,197,217 | 7/1965 | Mastrobattista et al. | 277/153 |
| 3,484,900 | 12/1969 | Sands et al. | 18/19 |
| 3,520,047 | 7/1970 | Muhlner et al. | 29/423 |
| 3,544,119 | 12/1970 | Glover | 285/379 X |
| 3,793,427 | 2/1974 | Heisler | 264/249 |
| 3,836,622 | 9/1974 | Sporre et al. | 264/249 |
| 3,854,732 | 12/1974 | Franz et al. | 277/153 X |
| 3,924,999 | 12/1975 | Harris et al. | 425/392 |
| 3,998,578 | 12/1976 | Acda | 425/393 |
| 4,046,387 | 9/1977 | Lee | 285/110 X |

FOREIGN PATENT DOCUMENTS

| 832368 | 2/1952 | Fed. Rep. of Germany | 277/153 |
| 631120 | 9/1927 | France | 285/110 |
| 834045 | 8/1938 | France | 277/153 |

Primary Examiner—Robert S. Ward, Jr.
Attorney, Agent, or Firm—Robert M. Krone; Joseph J. Kelly; Gregory W. O'Connor

[57] ABSTRACT

Joints for thermoplastic pipe. The necessity of providing a sealing ring between the socket and spigot of such a joint results in forming a ring groove in the socket and affixing the sealing ring within this ring groove. The present invention contemplates forming a sealing ring groove 6 so configured around a sealing ring 11 with a substantially axially incompressible portion 12 to lock the sealing ring in place and also to enhance the ease of assembly and ability of the thus assembled joint to structurally withstand elevated hydrostatic pressures. Also disclosed is an apparatus 20 and 44 for forming the preferred socket configuration.

10 Claims, 7 Drawing Figures

SEALING RING FOR SPIGOT AND SOCKET PIPE JOINT

TECHNICAL FIELD

The present invention relates to pipe joints, in particular pipe joints made specifically for or integral with the ends of thermoplastic pipe sections. The type of pipe joint of concern here is that which incorporates a sealing ring therein, positioned between the inner diameter of the socket portion of the joint and the outer diameter of the spigot portion of the joint.

A common problem with such socket and spigot form of pipe joint is the need to retain the sealing ring in proper position within the pipe joint, both during assembly and during operation of the fluid handling system of which the pipe joint is a part.

BACKGROUND OF THE PRIOR ART

The most common system for retaining the sealing ring in the socket portion of the joints is the use of a sealing ring groove which is defined in the inner portion thereof. In addition to a simple inwardly facing ring groove for retaining such sealing rings, a number of systems have been developed to more fixedly retain this sealing ring in the desired position.

U.S. Pat. No. 3,924,999, assigned to the assignee of the present invention, locks the sealing ring within the groove by thermoplastically deforming the lateral walls of the ring groove at spaced locations with the use of deforming members. These deforming members move at oblique angles to the sealing ring while the sealing ring is positioned on a mandrel assembly. The thus formed sealing ring groove incorporates a plurality of spaced segments which grip the enlarged outer portion of the sealing ring, thus preventing its displacement.

In U.S. Pat. No. 3,520,047 a sealing ring is held in place in the ring groove by the use of one or a pair of supporting rings flanking the sealing ring. These supporting rings are substantially rigid and define there between an annular space which firmly holds the sealing ring in place. Also, this patent states that the sealing ring and the support ring or rings may be firmly connected together by, for example, molding the sealing ring to the support ring. The support ring also serves as an annular ramp for radially expanding the heat-softened leading edge of a thermoplastic pipe over the sealing ring.

U.S. Pat. No. 3,836,622 shows three pipe joint arrangements. The first shows a sealing ring having a cross sectional configuration in which the axial dimension of the outer diameter exceeds inner diameter. The sealing ring is initially positioned within the profile of a forming mandrel while a heat-softened portion of thermoplastic pipe is led over this mandrel. The sealing ring is radially expanded to its approximate final configuration which further expands the heat-softened pipe and begins to form the sealing ring groove. Finally, annular jaws force the lateral wall portions of the ring groove inwardly to clampingly retain the sealing groove in its radially expanded position and aid in holding the sealing ring in this sealing position during assembly and use of the pipe joint.

A second configuration employs the use of a sealing ring having a circular cross section (a classic O-ring) which is rolled from a notched position in the forming mandrel by the leading edge of the heat-softened thermoplastic pipe. This action positions the O-ring in a ring groove as well as expands the O-ring to its approximate final dimension. Finally, clamping jaws conform the wall of the thermoplastic pipe to the outer surface of the O-ring.

A third pipe joint configuration includes a socket which is formed of a thermosetting plastic cast around a sealing ring having an outer, wedge-shaped portion. The thermosetting plastic is formed around at least this outer portion, thus locking the sealing gasket in its final, operative position.

As illustrated by the above cited patents, there exist systems for forming the pipe joint, and in particular for forming the ring groove about a pre-positioned sealing ring.

U.S. Pat. No. 3,793,427, assigned to the assignee of the present invention, demonstrates the use of a series of ramp bars pivotally attached to the forward portion of the mandrel. These bars can be positioned so as to cause the heat-softened pipe to expand beyond the outer diameter of the sealing ring, and then be pivoted inwardly to a position such that the heat-softened pipe collapses inwardly to form a substantially cylindrical portion of the socket. In this way, a retainer ring, such as that disclosed in U.S. Pat. No. 3,520,047, need not be used to lead the pipe over the sealing ring.

U.S. Pat. No. 3,484,900 shows a different system for forming the ring groove. In this system, an elastomeric, radially expandable section of the forming mandrel is caused to move radially outward by an axially moving conical cam surface. This radial outward expansion forces a section of heat-softened pipe to move outwardly in conformity to a female mold. On cooling, the resulting pipe section has a square-shouldered ring groove defined therein. The expansible elastomeric portion is permitted to move radially inwardly to permit the thus cooled socket to be removed from the mandrel.

Another similar use of an elastic or elastomeric expandable mandrel section is shown in U.S. Pat. No. 3,998,578.

BRIEF SUMMARY OF THE INVENTION

Accordingly, applicant has invented a socket of a spigot and socket joint for connecting a pipe to the spigot. This socket has a first substantially cylindrical portion, a second substantially cylindrical portion, and an inwardly open sealing ring groove positioned between and extending radially outwardly of the first and second cylindrical portions. This ring groove has an outer wall portion connected to the cylindrical portions by generally radially extending first and second wall portions. A sealing ring is fixedly positioned within the ring groove, the sealing ring including a substantially rigid outer portion and a flexible inner portion which is to sealingly engage the outer surface of a spigot. The axial distance between the inner surfaces of the first and second wall portions adjacent the outer portion of the sealing ring is substantially greater than the axial distance between the walls adjacent the inner portion of the ring. This dimensional relationship exists for substantially the entire circumference of the ring groove.

Also, applicant's invention embraces a method of forming the socket of a socket and spigot joint. This method comprises positioning a sealing ring on the outer surface of a mandrel and passing a first heated portion of a thermoplastic pipe over the mandrel while simultaneously radially expanding a first portion of the length of pipe. The sealing ring is positioned within the first portion of the plastic pipe such that the first portion flanks the sealing ring. Then the first portion is radially inwardly deformed at flanking locations to said sealing ring to form a first substantially cylindrical portion and a second substantially cylindrical portion. One of the thus formed cylindrical portions is axially compressed to form the final configuration of the ring groove holding the sealing ring. This final configuration is such that the axial distance between the inner surfaces of the first and second walls adjacent the outer wall of the ring groove is greater than the axial distance between the inner surfaces of these walls adjacent the first and second cylindrical portions.

Also disclosed is an apparatus for forming the socket of a spigot and socket joint. This apparatus includes a generally cylindrical mandrel for radially expanding selected portions of a heat-softened length of plastic pipe, this mandrel including a first radially expandable portion. This radially expandable portion is capable of being positioned in a number of configurations and a second cylindrical portion adjacent this expandable portion. The second cylindrical portion is configured to support a sealing ring thereon. The radially expandable portion includes means for radially expanding it from a first position, wherein the radially expandable portion has an outer diameter less than or equal to the inner diameter of the sealing ring, to a second radially expanded position wherein this portion has an outer diameter approximately equal to the final inner diameter of a corresponding portion of the socket to be formed. Also, this means is capable of expanding the expandable portion to a third radially expanded position wherein at least a portion of said radially expandable portion has an outer diameter equal to or greater than the outer diameter of the sealing ring.

DETAILED DESCRIPTION OF THE INVENTION

Figure 1:
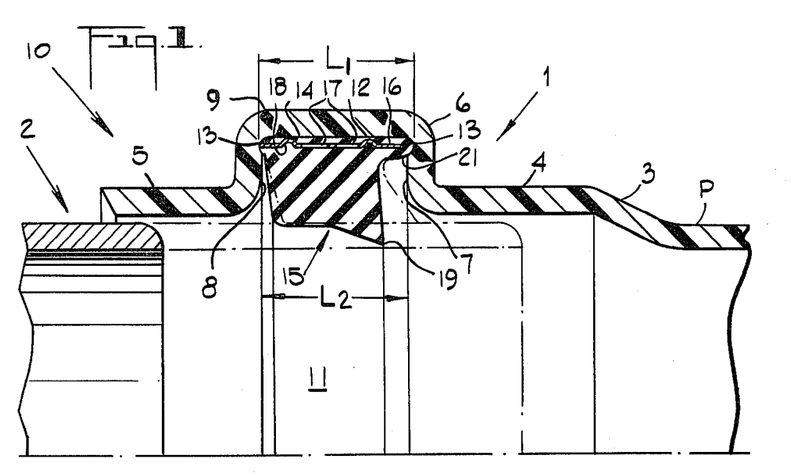
FIG. 1 shows a partial cross sectional view of a spigot and socket in accordance with the present invention.

FIG. 1 shows a partial cross sectional view of a preferred embodiment of the spigot and socket in accordance with the present invention. Pipe joint 10 consists in essence of two major structures. Socket 1 is so dimensioned to receive within its inner diameter spigot 2. As with many similar systems, socket 1 includes a sealing ring 11 which is received in sealing ring groove 6. In the preferred embodiment, socket 1 is formed from a terminal end portion of thermoplastic pipe P. It should be understood, of course, that socket 1 could be a portion of a coupling which would be adapted to receive two spigots similar to spigot 2. In this preferred embodiment, transition portion 3 connects socket 1 to the remaining portions of pipe P. Transition portion 3 merges with a first cylindrical portion 4, whose inner diameter exceeds to some degree the outer diameter of spigot 2, to be received therein. Second cylindrical portion 5 is in flanking relation with first cylindrical portion 4 beside sealing ring groove 6. Ring groove 6 is defined by outer wall portion 9 which is connected with the substantially cylindrical portions 4 and 5 via first wall portion 7 and second wall portion 8.

Sealing ring 11 preferably includes outer portion 12 integrally connected with inner resilient portion 15, which portion in turn includes sealing lip 19. Outer portion 12 has several characteristics which contribute to the overall socket structure. The outer portion 12 preferably includes a stiffening ring 16 substantially imbedded within this outer portion. Stiffening ring 16 imparts to outer portion 12 the characteristic of being substantially rigid, at last compared to inner portion 15. An aspect of this rigid characteristic is that outer portion 12 is substantially nondeformable in the axial direction. Secondarily, the rigid outer portion 12 tends to resist radial expansion, either caused by the force of spigot 2 positioned within the inner diameter of sealing ring 11 or as a result of hydrostatic pressure when the pipe socket is in its operative condition.

In the preferred embodiment, stiffening ring 16 comprises a continuous hoop of steel about 0.030 inches thick, extending from the extreme forwardmost portion of ring 11 to the rearwardmost portion thereof. Stiffening ring 16 could be a relatively solid and featureless ring of steel, however applicant has found it desirable to include protrusions 18 which position ring 16 within the body of the elastomeric material making up ring 11 during the molding thereof. Also, applicant has found it desirable to include perforations 17 through the body of ring 16. Perforations 17 assure a thorough bonding of the elastomeric material extending to both inner and outer diameters of ring 11, and also serve to transmit, via the body of elastomeric material, the pressure forces generated by hydrostatic pressures within the spigot and socket system in order to assure a more perfect sealing of ring 11 to the inner surface of wall portion 9. Perforations 17 should constitute approximately 20–70 percent of the overall surface area of ring 16. This relative percentage permits sealing ring 11 to react to the hydraulic forces involved in a relatively unhindered manner, yet such perforations are not so extensive as to substantially adversely affect the axial incompressibility or radial rigidity imparted to sealing ring 11 by stiffening ring 16. It has also been found desirable to make the overall length of sealing ring 11 slightly longer in the axial direction than the corresponding dimension of stiffening ring 16. This difference in length (preferably between 0.035 to 0.065 inches) is large enough to assure the substantial complete encapsulation of stiffening ring 16, yet is not so large as to result in outer portion 12 having substantial axial deformability.

Inner portion 15 of sealing ring 11 is made of the same elastomeric flexible material as the main body of ring 11 and is of known sealing design. Of particular note is the use of sealing lip 19 on the innermost portion thereof. Sealing lip 19 conforms to the outer surface of spigot 2 in a known manner and, together with the rest of inner portion 15, forms a compression seal thereon. Also, sealing lip 19 forms what is known as a hydraulic seal on spigot 2 since it reacts to the hydraulic pressure on the inner wall thereof to grip evermore tightly the outer wall of spigot 2. While the basic design of sealing lip 19 is known, its relationship to the operation of socket 1, and the configuration of the apparatus for forming socket 1 are unique as will be set forth in greater detail.

Shown in phantom in FIG. 1 is sealing ring 11 in its deflected condition with spigot 2 sealingly engaged thereby. Ring groove 6 is so dimensioned to accommodate the axial deflection of at least the inner portion of sealing ring 11 in response to this conforming fitting, as shown by spaces between first and second wall portions 7 and 8 and the inner portion 15 of sealing ring 11. Outer portion 12 extends axially beyond the main body of sealing ring 11 preferably a substantial amount. This permits the formation of a hydraulic seal 21 between the inner surface of wall portion 7 and the elastomeric material encapsulating the end edge of stiffening ring 16.

Important to the desired operation of socket 1 is the internal configuration of ring groove 6. The upper portion of ring groove 6, i.e. the inner surface of outer wall portion 9 and the radially outward portions of first and second wall portions 7 and 8, intimately conforms to the outer portion 12 of sealing ring 11. This intimate conforming defines a first axial dimension L1 which is the axial dimension of the distance between the inner surfaces of the first wall portion 7 and the second wall portion 8 adjacent the outer wall portion 9. Radially inwardly of dimension $L_1$ is a second axial dimension $L_2$ which, for substantially the entire circumferential distance around ring groove 6, has an axial dimension which is substantially less than the axial dimension $L_1$. This difference in axial dimensions, under certain conditions, results from the existence of annular indentation 13 which could occur on either or both of the edges of outer portion 12. In a typical socket, this difference amounts to about 10 percent of the axial dimension L, or about 0.050" to 0.060". It is this dimensional relationship, i.e. $L_1$ greater than $L_2$, which aids in fixedly holding sealing ring 11 in ring groove 6.

Clearly, this dimensional relationship is most easily provided by taking advantage of the substantial axial non-deformability of outer portion 12. Depending on the thickness or radial extent of this axially non-deformable outer portion 12, annular indentation 13 will be more or less pronounced or detectable. As will be more fully set forth when the apparatus is explained in its use of forming socket 1, annular indentation 13 may be absent and rather a negatively sloping wall portion at the inner surface of either of wall portions 7 and 8 may define the above dimensional relation. In any event, upper portion 12 aids in preventing sealing ring 11 from axially collapsing or axially distorting which would in turn prevent the desired dimensional relationship from coming about during the formation of the ring groove 6. Other advantages of the above described constructional features of socket 1 will be set forth shortly.

Figure 2A:
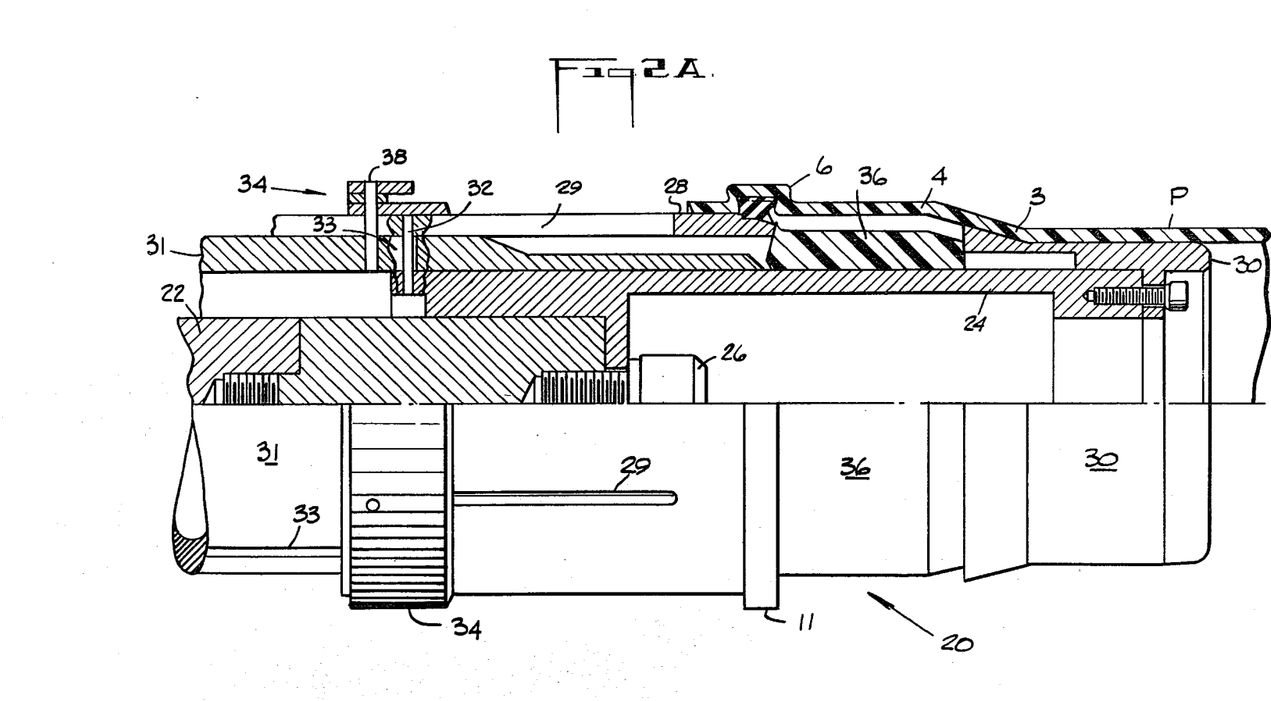
FIG. 2(a) shows the preferred embodiment of the major portion of the apparatus for forming the socket of FIG. 1.

Turning to FIG. 2(a), the preferred apparatus performing socket 1 will be set forth. FIG. 2(a) shows mandrel assembly 20 partially in cross section, with an end portion of thermoplastic pipe P in its final configured form position on the cutaway portion of assembly 20. Fixedly supporting the overall assembly is support shaft 22. Connector sleeve 24 is fixedly attached thereto by mounting bolt 26. At the distal end of connector sleeve 24 is mandrel nose 30, the distal end of which is so dimensioned to conform to the inner diameter of undistorted pipe P and to guide pipe P during the deformation operation. Fixedly mounted to connector sleeve 24 via stationary support pins 32 is stationary sleeve 28, which defines a substantially cylindrical outer surface having means at the distal end thereof to support sealing ring 11 in approximately its final undeformed configuration. At the spaced locations through the body of stationary sleeve 28 are axial slots 29 through which movable support pins 38 pass. Cam sleeve 31, which is capable of axial motion, supports back sleeve 34 via these pins 38. Thus, cam sleeve 31 and back sleeve 34 move simultaneously in the axial direction while stationary sleeve 28 remains fixed to the rest of the mandrel assembly 20 and relative to these axially moving parts. Cam sleeve 31 is so configured to be positioned selectively to one side of or radially within expander ring 36 which spans the axial distance between mandrel nose 30 and the distal end of stationary sleeve 28. As shown in FIG. 2(a), expander ring 36 is in a substantially unexpanded condition wherein its maximum outer diameter (which in the preferred embodiment is shown at the extreme left end thereof) is less than or at most equal to the innermost diameter of sealing ring 11. The importance of this relationship will be more fully set forth below.

Figure 2B:
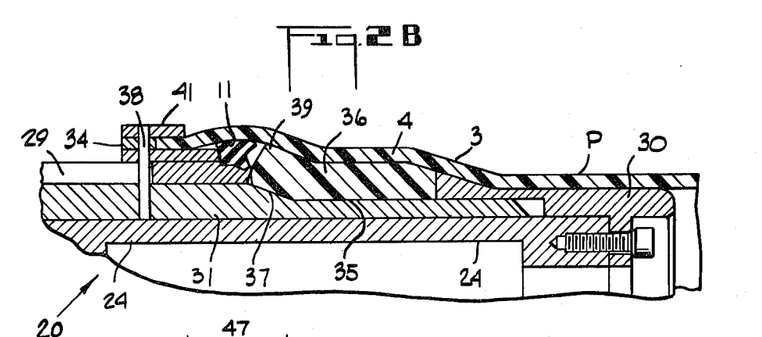
FIGS. 2(b) through 2(e) show a partial cross sectional view of the apparatus of FIG. 2(a) in sequential operation in accordance with the present invention.

FIG. 2(b) shows a partial cross sectional view of the apparatus of FIG. 2(a) in a different stage of the operation of this apparatus. Pipe P, which has been brought to its temperature of thermal deformability, has been moved axially relative to mandrel assembly 20 so that it has been radially expanded over various portions of mandrel assembly 20. It can be seen that transition portion 3 has been defined in pipe P and at least a portion of second substantially cylindrical portion 4, these two portions being defined by the outer surface configuration as presented by the corresponding portions of assembly 20. Note, however, that cam sleeve 31 is positioned very close to or towards mandrel nose 30, thus causing expander sleeve 36 to provide means for expanding a portion of pipe P radially outwardly to a diameter which exceeds the outer diameter of sealing ring 11. This is accomplished by having moved cam sleeve 31 axially such that a portion, specifically first cam surface 35 and second cam surface 37, are radially inward of expander ring 36. Expander ring 36, being an elastomeric and monolithic resilient body of polyurethane of a known formulation, responds to this by expanding radially outwardly and conforming to first cam surface 35 and second cam surface 37. This way a second radially expanded position is formed which, in effect, launches a portion of pipe P over sealing ring 11, much like the pivotal rods as disclosed in U.S. Pat. No. 3,793,427. To perform this step, it may be necessary to provide lip 39 at the extreme end of expander ring 36 in order to assure that the axially moving pipe clears sealing ring 11 in its path thereover. Back sleeve 34 is positioned against the back side of sealing ring 11 and further prevents displacement thereof by axial motion of thermally deformable pipe P. Also, the outer portion 41 of back sleeve 34 constrains the terminal end of the portion of pipe P. Axial motion of pipe P continues until the annular space between portion 41 and the rest of back sleeve 34 is filled with the heat-softened plastic. The importance of this will be discussed below.

Figure 2C:
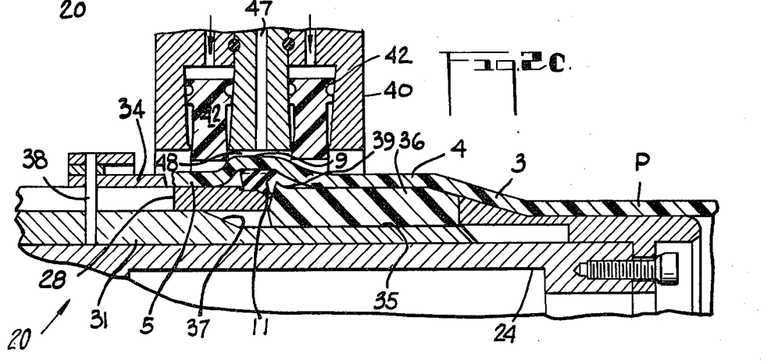

FIG. 2(c) shows cam sleeve 31 and its accompanying parts—back sleeve 34 and movable pin 38—in an axially displaced position wherein only cam surface 35 remains radially inward of expander ring 36. This permits the distal end of pipe P to move radially inward under its own elastic tendencies and moves lip 39 radially inwardly away from contact with the corresponding portion of pipe P. Here we see the outer wall 9 of the ring groove begin to form. First cylindrical portion 4 is substantially fully formed since, in this radially expanded position, the outer surface of expander ring 36 defines a cylindrical surface approximately equal to the final inner diameter of the corresponding portion of the finished socket. The socket, however, is clearly not complete since the portions of pipe P which flank outer wall 9 merely "drape" over sealing ring 11 and thus fail to have the desired configuration which takes full advantage of the rigid aspects of sealing ring 11.

Also shown in FIG. 2(c) is constrictor means 40 with constrictor rings 42 flanking sealing ring 11. As shown, rings 42 have begun to move radially inward to reshape the draped portions which flank sealing ring 11. The edges of rings 42 closest to sealing ring 11 first contact the pipe material. These corners continue to push inwardly on these areas, carrying the draped pipe portions radially inwardly and simultaneously sliding slightly on the outer surface as these draped portions stretch and/or flow to accommodate. During this shaping operation, expander ring 36 remains substantially unchanged. Constrictor rings 42 continue to move radially inward until cylindrical walls 4 and 5 are formed between the annular end surfaces of rings 42 and the corresponding cylindrical outer surfaces of 28 and 36.

Figure 2D:
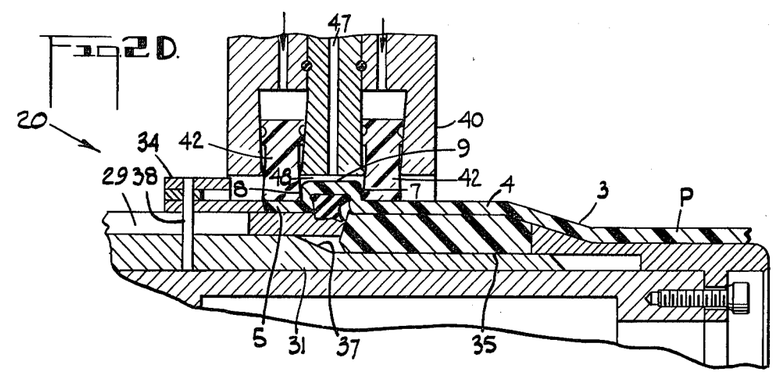

FIG. 2(d) shows the final shaping step. Constrictor rings 42 are shown in their final position with cylindrical portions 4 and 5 fully formed and radial walls 7 and 8 sharply defined and extending between these portions and outer wall 9. Outer wall 9 has been pulled into snug conformity with the outer surface of sealing ring 11 by the action of constrictor rings 42. The distal end of portion 5 has also been moved slightly towards ring 11 by the shaping action of constrictor rings 42.

Back sleeve 34, via pins 38 and cam sleeve 31, can now be brought to bear on the distal end surface of portion 5. While not vital to the successful shaping of the finished socket, the back sleeve can be used to smooth this end surface and can cause a slight plastic flow of the material of portion 5 towards sealing ring 11. This plastic flow, while slight (typically about 0.120″), assures that proper shaping of walls 7 and 8 have taken place so that the axial distance ($L_2$) between the inner surfaces of these walls is substantially less than the axial distance $L_1$ as has been set forth supra in relation to FIG. 1.

As can be seen, these operations point up the importance of providing a sealing ring 11 having a substantially axially incompressible outer portion since a sealing ring not having these characteristics would tend to deform in response to the pressures transmitted by the elastic wall portions of the heated pipe P. Should the sealing ring react in this way, it would be difficult, if not impossible, to define a ring groove which "locks" the sealing ring therein using a thermo-deforming process.

Annular space 48 is defined between constrictor rings 42 and the body of means 40 and the outer surface of groove 6. At the same time back sleeve 34 axially deforms distal end of portion 5, fluid, preferably air under pressure, may be introduced into this space via channel 47 to cause more intimate conforming of ring groove 6 to the outer portion 12 of ring 11. Chilled fluid, preferably water, may also be circulated therethrough to bring about cooling of these portions while being constrained by constrictor rings 42 and back sleeve 34, after the pressurization in space 48.

Figure 2E:
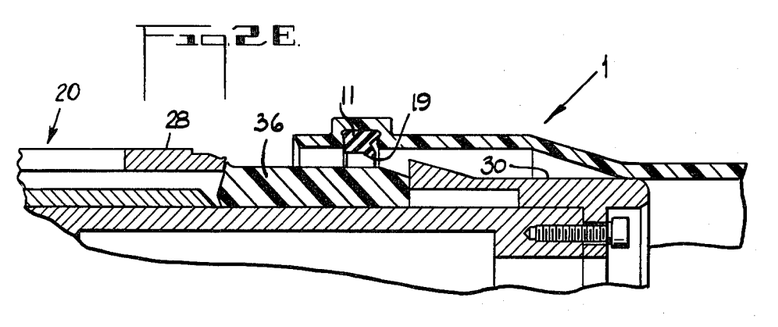

FIG. 2(e) shows assembly 20 in approximately the same configuration as that shown in FIG. 2(a), except socket 1 has been moved axially away from its formed position after having been cooled to the state of thermal indeformability. Expander ring 36 has been moved to its position wherein it has a maximum outer diameter which is less than (at most equal to) the inner diameter of sealing ring 11. This configuration is important when sealing ring 11 includes sealing lip 19, which could become caught on any gap between expander ring 36 and stationary sleeve 28 and/or mandrel nose 30. To this end, it has been found necessary to have expander ring 36 define a substantial portion of the outer surface of mandrel assembly 20 which corresponds to transition portion 3 of socket 1. The amount that this frusto-conical portion is defined by ring 36 depends on the slope defined thereby and the position at which the radial distance corresponding to the innermost dimension inner diameter of ring 11 is defined.

Figure 3:
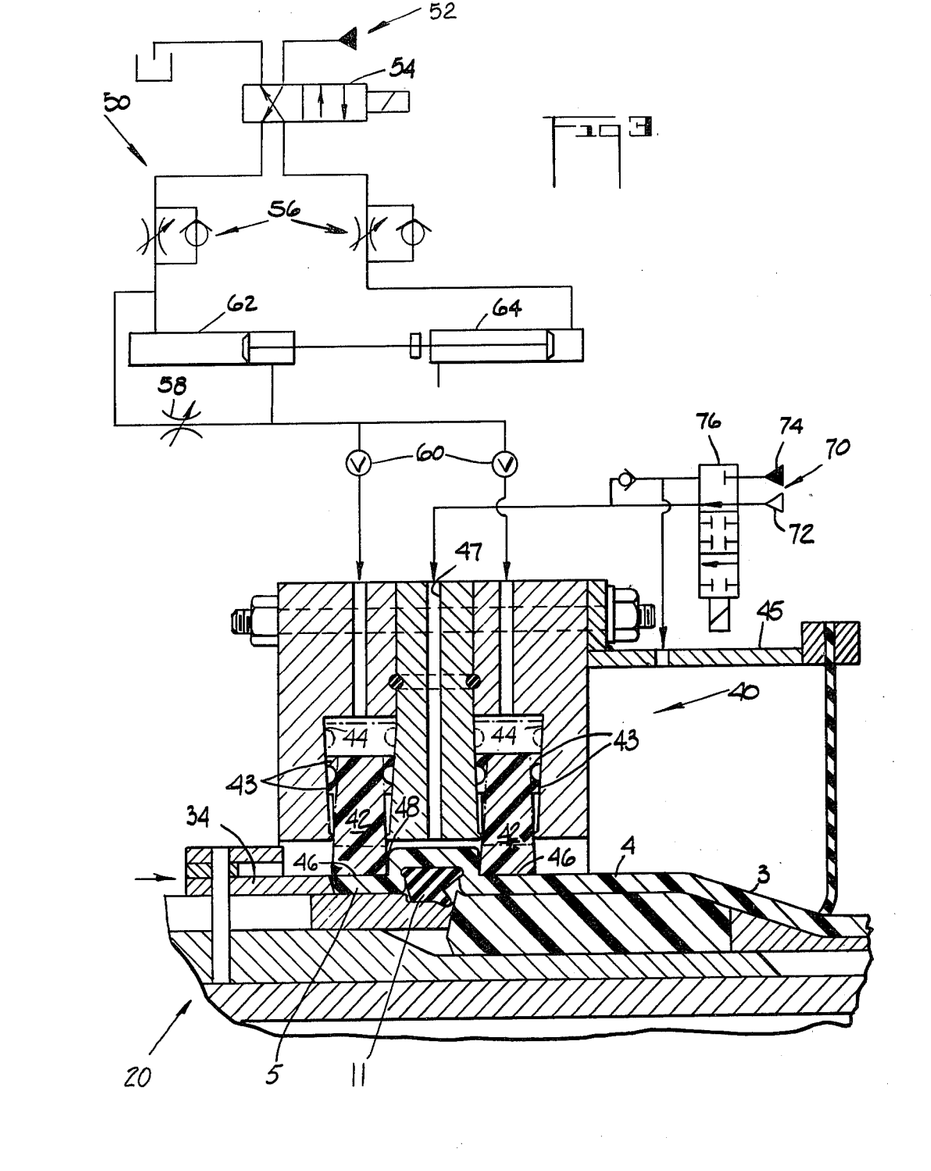
FIG. 3 shows in greater detail the operation and construction of the overall apparatus in accordance with the present invention.

Constrictor means 40 can be seen in greater detail in FIG. 3. Essentially it is comprised of of an annular structure having defined therein a hydraulic chamber 44 which essentially comprises an inward-facing annular groove. Within each such chamber (preferably two being provided as shown), constrictor ring 42 is positioned. Ring 42 preferably consists of a petroleum-resistant urethane elastomer which, in its undeformed, unstressed condition (as shown in phantom), fits within chamber 44 with sealing portions 43 (which comprise annular projections which extend around the entire circumference of 42) conformably engaging the annular wall portions of chamber 44.

With an application of hydraulic pressure to chambers 44, constrictor ring 42 responds by moving radially inwardly towards mandrel assembly 20 and the portions of heat-softened pipe positioned thereover. Socket engaging surfaces 46 of each constrictor ring 42 press on the corresponding outer surfaces of socket 1 causing the heat-softened plastic to intimately conform to the mandrel surfaces therebelow as has been explained with reference to FIG. 2(c) and 2(d). It should be noted that the radial walls of each chamber 44 taper inwardly such that the sealing portions 43 grip ever tighter thereto. Thus, as the hydraulic pressure increases (and, hence, the tendency of the hydraulic fluid to leak), sealing portions 43 engage more firmly the corresponding wall portions of chamber 44. This prevents or reduces the chance of hydraulic pressure leaking past those sealing portions 43. The inwardly or radially constricted condition of each constrictor ring 42 is shown. Since the urethane elastomeric material making up 42 is substantially incompressible, the volume of material making up 42 must be accommodated in some way as it moves from a first diameter in the unstressed condition to a smaller diameter in its socket-engaging condition. This accommodation result in enlargement in the axial direction of socket engaging surfaces 46 shown in a slightly exaggerated manner by the trapezoid shape as shown. This action is taken advantage of in the overall system, since this tends to move at least a portion of the cylindrical portions flanking sealing ring groove 6 and thus to aid in forming the desired inner configuration of sealing ring groove 6. This also simplifies considerably the tooling involved in making the overall constrictor means 40 since, while the constrictor rings 42 move in a substantially right angle radial direction, a certain axial component, at the corners of each constrictor ring 42, is provided by this axial accommodation or flow. It should be understood, however, that should this axial movement be inadequate for the particular purpose involved hydraulic chambers 44 and constrictor rings 42 could be constructed in a frustoconical configuration and thus move bodily in an oblique direction when operated, much in the manner of the individual forming members as disclosed in U.S. Pat. No. 3,924,999.

The motion of back sleeve 34 is pictorially represented in 34 by an arrow. FIG. 3 best shows the interrelated operation of constrictor ring 42 and back sleeve 34 when forming the final ring groove configuration. With constrictor ring in its inwardly constricted position as shown, back sleeve 34 axially distorts portion 5 of socket 1. The socket-engaging surface 46 becomes, in effect, a radially inexpandable cylindrical surface against which heat-softened pipe portion cannot move. Hence, the only place for the pipe to distort in response to the actual axial force of back sleeve 34 is towards sealing ring 11. Since the outer portion 12 of sealing ring 11 is axially non-deformable, that portion of wall portion 8 radially inward of outer ring portion 12 molds to form, in combination with a similar configuration on the other axial side of sealing ring 11, a final axial dimension between the inner surfaces of the walls 7 and 8 which is substantially less than a corresponding dimension at the outer portion 12 of ring 11.

While the elastic memory of the preferred urethane material making up constrictor ring 42 is usually adequate to bring ring 42 to its rest position radially outward of socket 1, Applicant has found it desirable to provide hydraulic pressure system 50 which can also act to exhaust the hydraulic pressure from each chamber 44 under a negative pressure and thus aid the restoration of each constrictor ring 42 to its rest position.

Hydraulic pressure source 52 operates the rest of system 50 via pressure control operated reversing valve 54. Shown in FIG. 3, hydraulic pressure passes through valve 54 through one of the adjustable speed control valves 56 to one side of first cylinder 62. Sequencing valves 60 pressurize hydraulic chambers 44 and move constrictor rings 42 to the radially inward position as shown via fluid displaced from the other side of cylinder 62. Parallel piping, through adjustable flow valve 58, allows the addition of hydraulic fluid to the major system. Under normal conditions, this valve 58 is closed or at most is slightly open. To withdraw constrictor rings 42 from the radially inward position shown, valve 54 is operated to pressurize, through the other valve 56, second cylinder 64 and remove pressure from first cylinder 62. Cylinder 64 moves the piston of cylinder 62 and creates a negative fluid pressure to forcibly withdraw the hydraulic fluid from chambers 44 via valves 60. Thus, constrictor rings 42 are aided to move to their withdrawn position by the pressure differential from the inside of each chamber 44 and atmospheric pressure on the socket-engaging surfaces 46. Constrictor means 40 can be operated in this mode for a considerable length of time before the inevitable, slight loss of hydraulic fluid on the walls of chambers 44 requires that throttle valve 58 be opened slightly to increase the volume of fluid within this portion of the system to make up for the above noted fluid loss.

Also shown on FIG. 3 is the system for providing pressurizing air and chill water to the annular space surrounding ring groove 6 and chill water only over the forward cylindrical section 4 and transition section 3. Constrictor means 40 is placed in the condition whereby engaging surfaces 46 press on respective portions of the socket 1, an effective seal is made at these surfaces permitting air pressure from air pressure source 72 to pass via passage 47 in the body of constrictor means 40 to annular space 48. As stated previously, this pressure causes the plastic material making up ring groove 6 to intimately conform to the corresponding portions of sealing ring 11. While so pressurized, or immediately after release of pressure from air pressure source 72, chilled water from water source 74 is passed via passage 47, or another passage in the body of constrictor means 40, to annular space 48 via solenoid operating valve 76. The chilled water cools the ring groove 6, holding it in the desired position. Of course, it is understood that chilling water from source 74 is exhausted from annular space 48 by a channel, similar to passage 47, at a position radially remote from passage 47. Can 45 may also be provided and chilled water is injected to the interior of can 45 to cool the portions 3 and 4 contained therein.

The desirable aspects of socket 1 will now become apparent. First of all, the benefits of a hydraulic seal as provided by sealing lip 19 can be fully utilized and higher hydrostatic pressures within the spigot and socket system can be tolerated since sealing lip 19 aids in enhanced sealing as hydrostatic pressure mounts. Also, the substantially rigid outer portion 12 of ring 11 aids in resisting the elastic and plastic yielding of the corresponding portion of socket 1 in response to high hydrostatic pressures. Second wall portion 8 and second cylindrical portion 5, which normally have little structural function in resisting hydrostatic pressure, contribute to the overall structural integrity of the socket as outer portion 12 transmits the axial force provided by the hydrostatic pressure to these portions of the socket. While perforations 17 in turn transmit this hydrostatic pressure via the body of the elastic material making up sealing ring 11 to the inner surface of outer wall 9, the radially inexpansible aspect of stiffening ring 16 reinforces the ring groove 6, preventing radial excursion of this portion of the socket and subsequent failure of the joint. Such failure can occur either by fracture of the socket after it reaches its yield point or extrusion of the sealing ring out between the spigot 2 and the end of the thus yielding socket. Considerable benefit is provided by the preferred configuration in terms of preventing displacement of sealing ring 11 during the assembly of the joint. The "locked in" aspect of the sealing ring in ring groove 6 as well as the rigidifying benefit provided by member 16 prevents displacement of the forward portion of sealing ring 11 should spigot 2 be thrust into socket 1 at an extreme angle. The "locked-in" feature also allows pipe to be shipped with rings already in place and prevents rings from being removed prior to use.

Of course other configurations than the one disclosed could meet the requirements of the invention. Outer portion 12 of sealing ring 11 is shown to be constructed of a substantially embedded stiffening ring 16 of steel. It should be understood that outer portion 12 could be constructed of a completely separate elastomeric member having physical characteristics which make it substantially axially non-deformable or otherwise "rigid" as defined above. Also, while the material making up sealing ring 11 is shown to continue to the outer surface past ring 16, this surface could be provided by a separate soft elastomeric member or one which is added after the rigidifying element is affixed to the main body of sealing ring 11.

We claim:

1. A socket of a spigot and socket joint for connecting a pipe to said socket, said socket having a first substantially cylindrical portion, a second substantially cylindrical portion, an inwardly open sealing ring groove positioned between and extending radially outwardly of said first and second cylindrical portions, said ring groove having an outer wall portion connected to said cylindrical portions by generally radially extending first and second wall portions, a sealing ring fixedly positioned within said ring groove, said sealing ring including a substantially rigid outer portion and a resilient inner portion for sealingly engaging the outer surface of said spigot, the axial distance between the inner surfaces of said first and second wall portions adjacent said outer portion of said ring being substantially greater than the axial distance between said walls adjacent said inner portion of said ring, at least for substantially the entire circumference of said ring groove.

2. A socket as set forth in claim 1, wherein said socket is a bell formed in one end of said pipe of thermoplastic material, said bell being attached to the remainder of said pipe by a transition portion such that the diameter of the inner wall of said first and secnd cylindrical portions exceeds the outer diameter of the remainder of said pipe.

3. A socket as set forth in either claim 1 or claim 2, wherein said outer portion of said sealing ring includes a stiffening ring substantially entirely encapsulated therein, said stiffening ring extending circumferentially around the entire sealing ring and extending axially from said first wall portion to said second wall portion so as to make said outer portion of said ring substantially non-deformable in the axial direction.

4. A socket as set forth in claim 3, wherein said stiffening ring includes perforations for permitting continuity of the material making up said sealing ring from said outer wall of said ring groove to said inner portion of said sealing ring.

5. A socket as set forth in claim 1, wherein an inner surface of one of said first and second wall portions adjacent said outer wall portion includes a substantially continuous annular indentation, which indentation engages one end of said outer portion of said sealing ring whereby said sealing ring is fixedly held in said ring groove.

6. A socket as set forth in claim 5, wherein both said first wall portion and said second wall portion include an annular indentation.

7. A socket as set forth in either claim 1 or claim 2, wherein said outer portion of said ring includes means for rendering said outer portion substantially axially non-deformable relative to the rest of said sealing ring.

8. A socket as set forth in claim 7, wherein said outer portion of said ring includes an outer surface portion of a flexible material for permitting said sealing ring to intimately engage the inner surface of said outer wall portion of said ring groove.

9. A socket as set forth in claim 3, wherein the inner portion of said sealing ring is configured so as to form a hydraulic seal on the outer surface of said spigot, the configuration including a sealing lip.

10. A socket as set forth in claim 7, further including a hydraulic seal between said outer portion of said sealing ring and the inner surface of said first wall portion.

* * * * *